US010046806B2

(12) United States Patent
Kabayama

(10) Patent No.: US 10,046,806 B2
(45) Date of Patent: Aug. 14, 2018

(54) VEHICLE BODY STRUCTURE FOR AUTOMOBILE

(71) Applicant: Honda Motor Co., Ltd., Tokyo (JP)

(72) Inventor: Shohei Kabayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 15/391,989

(22) Filed: Dec. 28, 2016

(65) Prior Publication Data

US 2017/0197665 A1    Jul. 13, 2017

(30) Foreign Application Priority Data

Jan. 12, 2016   (JP) .................................. 2016-003369

(51) Int. Cl.
*B62D 25/20*       (2006.01)
*B62D 25/08*       (2006.01)

(52) U.S. Cl.
CPC ......... *B62D 25/088* (2013.01); *B62D 25/087* (2013.01)

(58) Field of Classification Search
CPC ........................... B62D 25/087; B62D 25/088
USPC ........................................ 296/193.08, 203.04
See application file for complete search history.

(56) References Cited

U.S. PATENT DOCUMENTS

| 5,123,696 A * | 6/1992 | Watari ................. B62D 25/088 |
| | | 296/201 |
| 9,168,957 B2 * | 10/2015 | Yano .................... B62D 25/087 |
| 9,616,937 B2 * | 4/2017 | Sasaki ................... B62D 29/00 |
| 2017/0197665 A1 * | 7/2017 | Kabayama ........... B62D 25/088 |

FOREIGN PATENT DOCUMENTS

JP    5377047 B2    12/2013

\* cited by examiner

*Primary Examiner* — Pinel E Romain
(74) *Attorney, Agent, or Firm* — Westerman, Hattori, Daniels & Adrian, LLP

(57) ABSTRACT

A vehicle body structure for an automobile includes a damper base connected to an outer wall of a rear side frame in a vehicle width direction on a rear side of a cross member and including a first bead projecting inward in the vehicle width direction and extending in an up-down direction and a damper support portion projecting outward in the vehicle width direction disposed on both sides of the first bead in a front-rear direction, a rear wheel house having a second bead extending in the up-down direction to overlap with an inner surface of of the first bead in the vehicle width direction, and a gusset having a third bead extending in the up-down direction to overlap with the inner surface of the first bead in the vehicle width direction and connected to an upper wall of the rear side frame.

11 Claims, 5 Drawing Sheets

VEHICLE BODY STRUCTURE FOR AUTOMOBILE

CROSS REFERENCES TO RELATED APPLICATIONS

The present application claims priority under 35 U.S.C. § 119 to Japanese Patent Application No. 2016-003369, filed Jan. 12, 2016, entitled "Vehicle Body Structure for Automobile." The contents of this application are incorporated herein by reference in their entirety.

TECHNICAL FIELD

The present disclosure relates to a vehicle body structure for an automobile in which damper bases are connected to rear side frames on a rear side of a cross member that separates a cabin and a luggage compartment.

BACKGROUND

Japanese Patent No. 5377047 discloses that right and left damper bases for supporting upper ends of dampers for rear wheels are connected to both ends of a cross member extending in a vehicle width direction and that rear-pillar gussets, which are formed by bending end portions of the cross member upward, are connected to inner surfaces of rear pillars in the vehicle width direction to transmit and distribute the load from the damper bases to the cross member and the rear pillars.

According to the present inventors, when the cross member is offset frontward from the right and left damper bases, it is difficult to transmit the load from the damper bases only to the cross member. Hence, there is a need to efficiently transmit and distribute the load from the damper bases to right and left rear side frames. For that purpose, it is important to increase the strength of the damper bases themselves and the strength of connecting portions between the damper bases and the rear side frames. However, the strengths need to be increased while minimizing the increase in number of components and the increased in weight.

SUMMARY

The present disclosure describes that the load from damper bases is effectively transmitted and distributed to right and left rear side frames while minimizing the increase in number of components and the increase in weight.

According to a first aspect of the present disclosure, there is proposed a vehicle body structure for an automobile, including a damper base connected at a lower end to an outer wall of a rear side frame in a vehicle width direction on a rear side of a cross member configured to separate a cabin and a luggage compartment and including a first bead projecting inward in the vehicle width direction and extending in an up-down direction and a damper support portion projecting outward in the vehicle width direction on both sides of the first bead in a front-rear direction to support an upper end of a damper, a rear wheel house having a second bead extending in the up-down direction to overlap with an inner surface of an upper part of the first bead of the damper base in the vehicle width direction, and a gusset having a third bead extending in the up-down direction to overlap with an inner surface of a lower part of the first bead of the damper base in the vehicle width direction and connected at a lower end to an upper wall of the rear side frame.

According to the structure of the first aspect, the strength of the damper base itself and the connection strength between the damper base and the rear side frame can be increased and the load input from the damper to the damper base can be reliably transmitted and absorbed to the rear side frame while minimizing the increase in number of components and the increase in weight by overlapping the first to third beads.

According to a second aspect of the present disclosure, based on the structure of the first aspect, preferably, a reinforcing member is disposed inside the rear side frame, and the lower end of the gusset is opposed to the reinforcing member with the upper wall of the rear side frame being disposed therebetween.

According to the structure of the second aspect, the effect of the gusset for reinforcing a connecting portion between the damper base and the rear side frame can be increased, and the load from the damper base can be effectively distributed to the rear side frame.

According to a third aspect of the present disclosure, based on the first aspect, preferably, the cross member forms an upper side of a rectangular frame in rear view and includes a damper-base stiffener having a fourth bead extending in the up-down direction to overlap with an inner surface of the second bead of the rear wheel house in the vehicle width direction, and the damper-base stiffener forms a part of a rear wall of the cross member.

According to the structure of the third aspect, the second bead of the rear wheel house and the fourth bead of the damper-base stiffener overlap with the first bead of the damper base in a three-layer form, and this increases the strength. In addition, rigidity of the rear part of the vehicle body can be increased by connecting the damper base to the cross member with the damper-base stiffener being disposed therebetween.

According to a fourth aspect of the present disclosure, based on the first aspect, preferably, the rear wheel house has an opening facing a lower end of the second bead, and the opening is closed by the damper base from an outer side in the vehicle width direction.

According to the structure of the fourth aspect, the weight of the rear wheel house can be reduced by the opening, and the strength of the rear wheel house reduced by the opening can be compensated for by the damper base having high strength.

According to a fifth aspect of the present disclosure, based on the first aspect, an upper end of the damper base may be connected to a rear end of a roof side rail.

According to the structure of the fifth aspect, the load input from the damper can be distributed to the roof side rail via the damper base having high strength.

For example, an upper cross member of an embodiment corresponds to the cross member of the present disclosure, a rear damper of the embodiment corresponds to the damper of the present disclosure, and a bulkhead of the embodiment corresponds to the reinforcing member of the present disclosure.

BRIEF DESCRIPTION OF THE DRAWINGS

The advantages of the disclosure will become apparent in the following description taken in conjunction with the following drawings.

DETAILED DESCRIPTION

An embodiment of the present disclosure will be described below with reference to FIGS. 1 to 5. In this specification, a front-rear direction, a right-left direction (vehicle width direction), and an up-down direction are defined based on an occupant sitting on a driver's seat.

Figure 1:
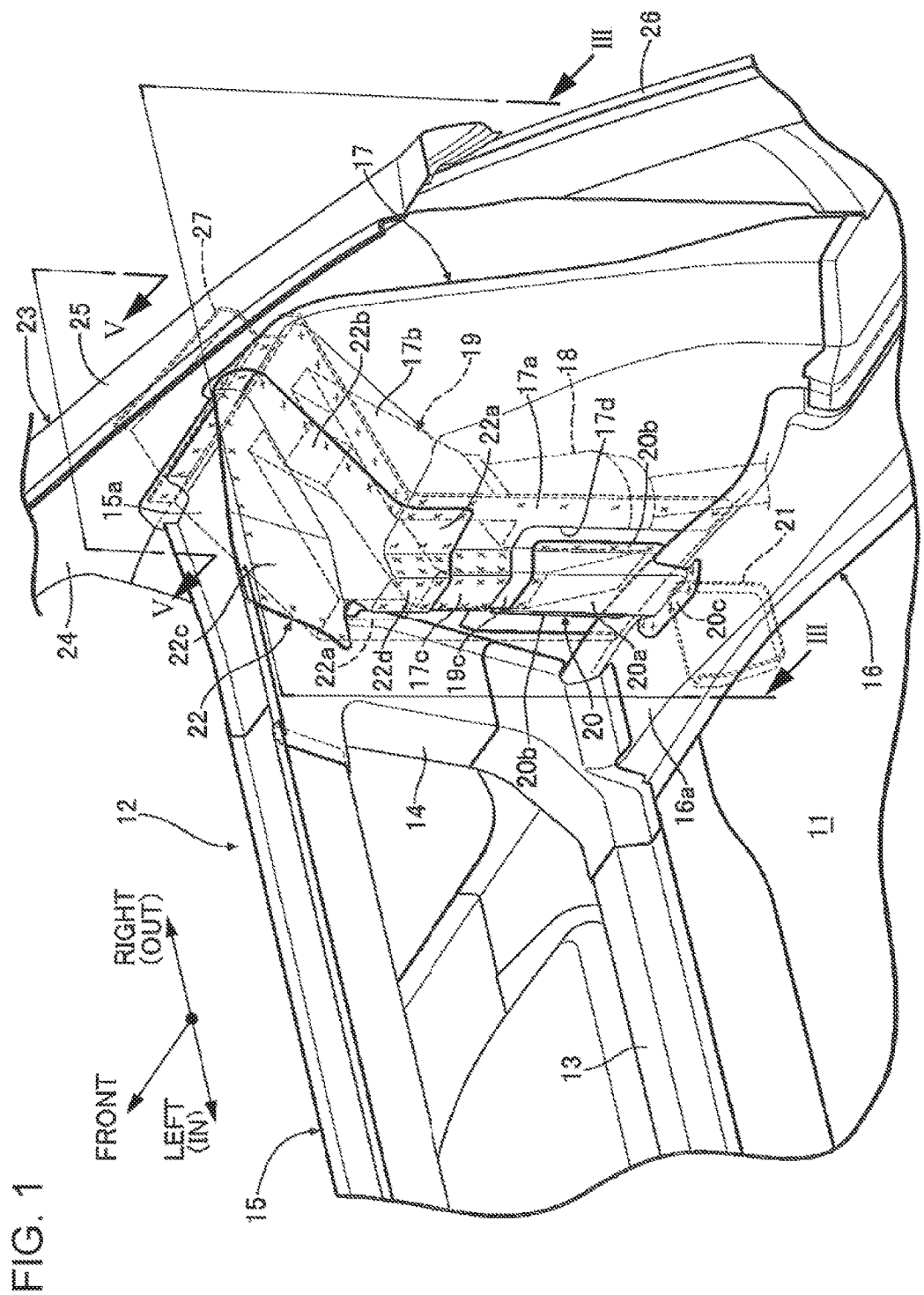
FIG. 1 is a partial perspective view of the interior of a luggage compartment in a rear part of a vehicle body of an automobile.
Figure 2:
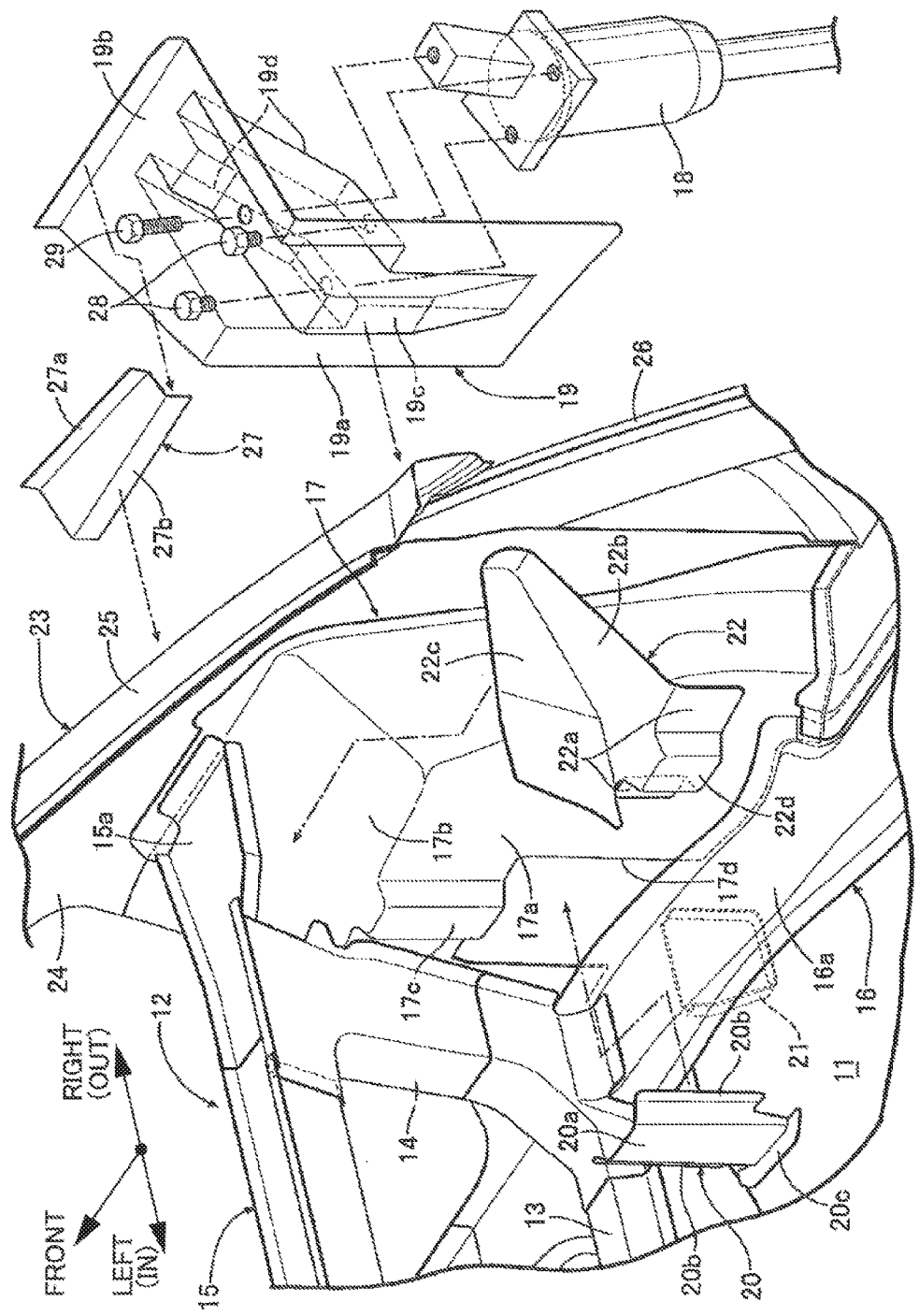
FIG. 2 is an exploded perspective view of the principal part of FIG. 1.

FIGS. 1 and 2 illustrate a state of a right half part of a luggage compartment in the rear of a vehicle body of an automobile, as viewed from an upper rear side. At a front end of a luggage compartment floor 11 that forms a floor surface of the luggage compartment, a frame 12 shaped like a horizontally long rectangle is disposed to separate the luggage compartment from a front cabin. The frame 12 includes a lower cross member 13 extending in the vehicle width direction along an upper surface of the luggage compartment floor 11, a pair of right and left vertical members 14 standing upward from outer ends of the lower cross member 13 in the vehicle width direction, and an upper cross member 15 that connects upper ends of the right and left vertical members 14 in the vehicle width direction. A pair of right and left rear side frames 16 extend in the front-rear direction along both side portions of the luggage compartment floor 11 in the vehicle width direction. Lower ends of the right and left vertical members 14 are connected to upper walls 16a of the rear side frames 16, respectively.

Rear wheel houses 17 opposed to inner sides of rear wheels in the vehicle width direction are connected to the vertical members 14 and outer side walls of the rear side frames 16 in the vehicle width direction, respectively. Damper bases 19 that support upper ends of rear dampers 18 for suspending the rear wheels are overlapped with outer sides of the rear wheel houses 17 in the vehicle width direction, respectively.

As illustrated in FIGS. 1 to 4A to 4D, each damper base 19 includes a substantially flat vertical wall 19a extending in the up-down direction, an inclined wall 19b inclined outward from an upper end of the vertical wall 19a in the vehicle width direction, one first bead 19c extending in the up-down direction over the vertical wall 19a and the inclined wall 19b and projecting inward in the vehicle width direction, and two bead-like damper support portions 19d adjoining front and rear sides of the first bead 19c, extending in the up-down direction over the vertical wall 19a and the inclined wall 19b, and projecting outward in the vehicle width direction. A lower part of the first bead 19c projects inward from the vertical wall 19a in the vehicle width direction, but an upper part of the first bead 19c projects outward from the inclined wall 19b in the vehicle width direction. The damper support portions 19d project outward from both the vertical wall 19a and the inclined wall 19b in the vehicle width direction.

Each rear wheel house 17 includes a vertical wall 17a extending in the up-down direction and an inclined wall 17b inclined outward from an upper end of the vertical wall 17a in the vehicle width direction. In an upper part of the vertical wall 17a, a second bead 17c extends in the up-down direction and projects inward in the vehicle width direction. In a lower part of the vertical wall 17a, a rectangular opening 17d that a lower end of the second bead 17c faces is provided. When the damper base 19 is overlapped with the outer side of the rear wheel house 17 in the vehicle width direction, a center portion in the up-down direction of the first bead 19c of the damper base 19 is fitted in the second bead 17c of the rear wheel house 17. However, an upper part of the first bead 19c is positioned apart outward from the rear wheel house 17 in the vehicle width direction, and a lower part of the first bead 19c is exposed from the opening 17d of the rear wheel house 17.

A gusset 20 for reinforcing a connecting portion between the damper base 19 and the corresponding rear side frame 16 has first flanges 20b on both sides in the front-rear direction of a third bead 30a extending in the up-down direction, and a second flange 20c at a lower end of the third bead 20a. In a state in which the third bead 20a of the gusset 20 is overlapped with the inner side of the first bead 19c of the damper base 19 in the vehicle width direction on an inner side of the opening 17d of the rear wheel house 17, the first flanges 20b of the gusset 20 are connected to the vertical wall 19a of the damper base 19, and the second flange 20c of the gusset 20 is connected to the upper wall 16a of the rear side frame 16. A bulkhead 21 is fixed inside the rear side frame 16, and the second flange 20c of the gusset 20 is opposed to the bulkhead 21 with the upper wall 16a of the rear side frame 16 being interposed therebetween. In the present application, the term "bead" means a protrusion straightly protruding outward from a plane surface of a metal plate such as the first bead 19c as well as a protruding structure, such as the third bead 20a, which has a U-shaped cross section or a channel shape cross section protruding outward from a pair of flanges 20b, 20b disposed on both sides of the protruding structure. In other words, the protruding structure straightly protrudes outward from the plane surface of the pair of flanges.

Damper-base stiffeners 22 reinforce connecting portions between the upper cross member 15 and the vertical members 14 in the frame 12. Each damper-base stiffener 22 includes a vertical wall 22a extending in the up-down direction, an inclined wall 22b extending outward from an upper end of the vertical wall 22a in the vehicle width direction, and a lateral wall 22c extending upward from a front end of the inclined wall 22b. A fourth bead 22d extending in the up-down direction projects from the vertical wall 22a to project inward in the vehicle width direction. The vertical wall 22a of the damper-base stiffener 22 is connected to an inner surface of the vertical wall 17a of the rear wheel house 17 in the vehicle width direction, the inclined wall 22b of the damper-base stiffener 22 is connected to an upper surface of the inclined wall 17b of the rear wheel house 17, and the lateral wall 22c of the damper-base stiffener 22 forms a rear wall of an outer end portion of the upper cross member 15 in the vehicle width direction. In this state, the fourth bead 22d of the damper-base stiffener 22 overlaps with an inner surface of the second bead 17c of the rear wheel house 17 in the vehicle width direction.

Figure 4A:
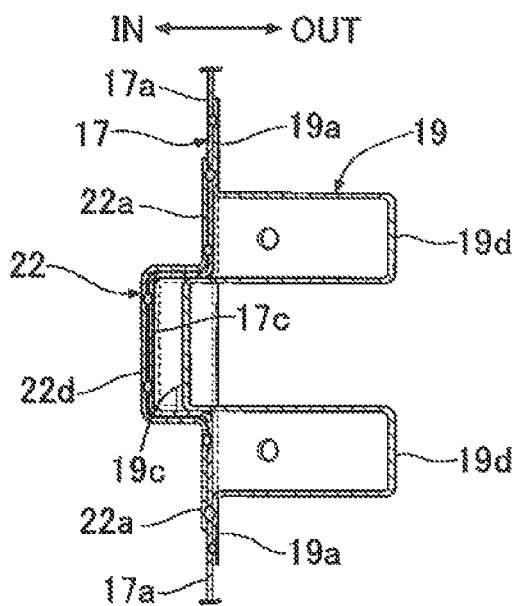
FIGS. 4A to 4D are cross-sectional views taken along lines IVA-IVA to IVD-IVD of FIG. 3.
Figure 4B:
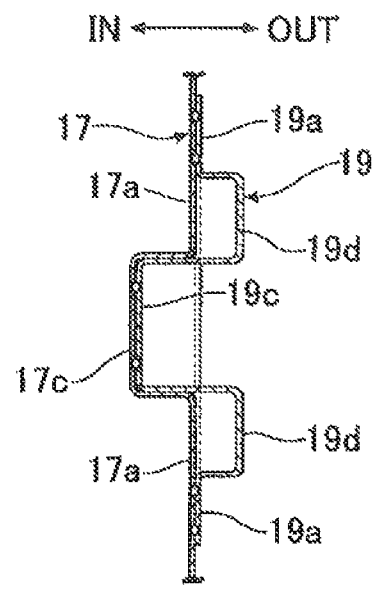
Figure 4C:
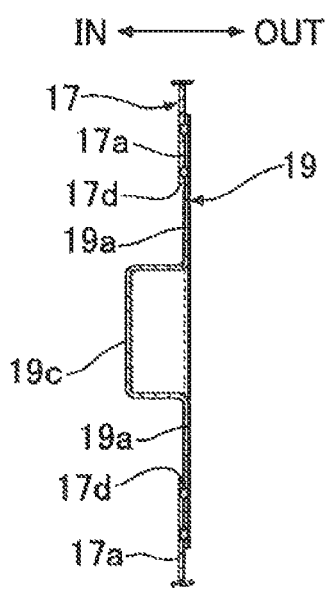
Figure 4D:
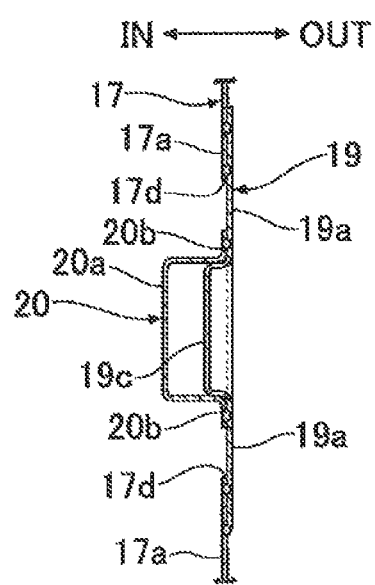

Therefore, at a position in a IVA-IVA cross section of FIG. 4A, the second bead 17c of the rear wheel house 17 and the fourth bead 22d of the damper-base stiffener 22 are joined in a two-layer form, and the first bead 19c of the damper base 19 is separated outward in the vehicle width direction while being partly fitted in the second bead 17c of the rear wheel house 17. At a position in a IVB-IVB cross-section of FIG. 4B, the first bead 19c of the damper base 19 and the second bead 17c of the rear wheel house 17 are joined in a two-layer form. At a position in a IVC-IVC cross section of FIG. 4C, the first bead 19c of the damper base 19 does not overlap with any other bead, but is exposed in the luggage compartment. At a position in a IVD-IVD cross section of FIG. 4D, the first bead 19c of the damper base 19 is separated outward in the vehicle width direction while being partly fitted in the third bead 20a of the gusset 20.

An upper end of the rear damper 18 is fastened to lower surfaces of the front and rear damper support portions 19d of the damper base 19 with two bolts 28, and is fastened to a lower surface of the first bead 19c with one bolt 29.

Figure 3:
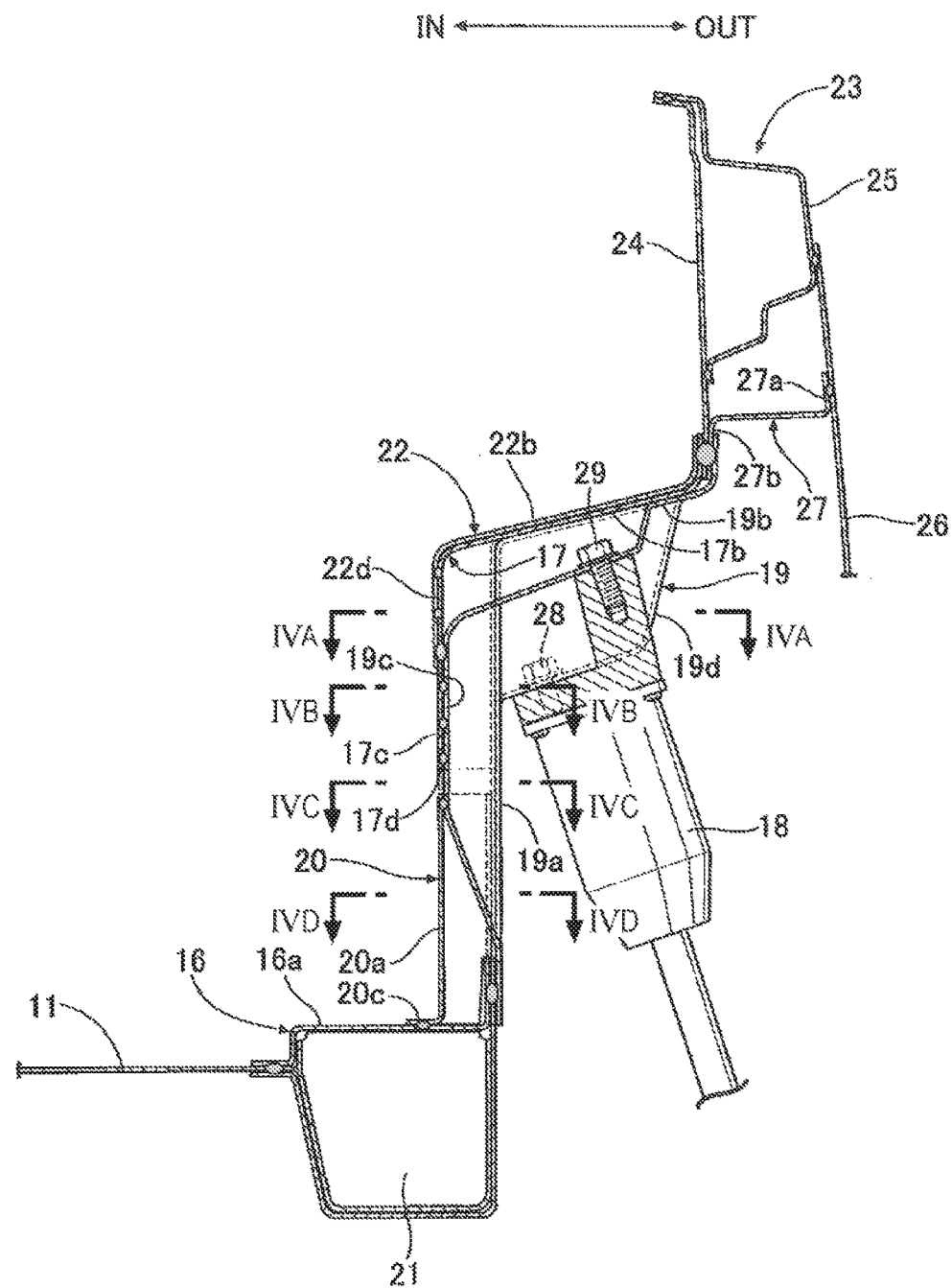
FIG. 3 is a cross-sectional view taken along line of FIG. 1.
Figure 5:
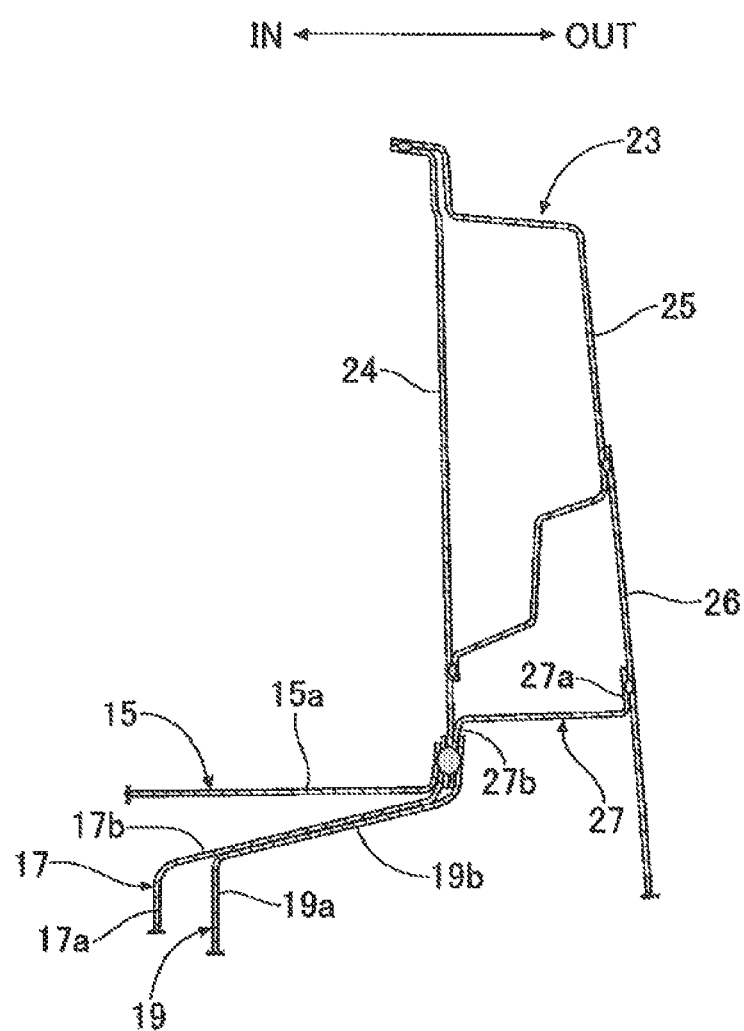
FIG. 5 is a cross-sectional view taken along line V-V of FIG. 1.

As illustrated in FIGS. 3 and 5, a roof side rail 23 that forms each of right and left side portions of a roof is structured to have a closed cross section by joining a plate-like roof side rail inner 24 and a groove-like roof side rail outer 25. A flange 27a at an outer end in the vehicle width direction of a stiffener 27 is connected to an inner surface of a side outer panel 26 with its upper end connected to an outer surface of the roof side rail outer 25 in the vehicle width direction. A flange 27b at an inner end of the stiffener 27 in the vehicle width direction, a lower edge of the roof side rail inner 24, an upper end of the rear wheel house 17, an upper end of the damper base 19, and an upper end of the damper-base stiffener 22 (or an upper wall 15a of the upper cross member 15) are connected in a five-layer form.

Next, a description will be given of the operation of the embodiment of the present disclosure having the above-described structure.

The lower end of the damper base 19 is connected to the outer wall of the rear side frame 16 in the vehicle width direction on the rear side of the upper cross member 15 that forms the upper side of the frame 12 for separating the cabin and the luggage compartment. The damper base 19 includes the first bead 19c projecting inward in the vehicle width direction and extending in the up-down direction and the damper support portions 19d provided on both sides of the first bead 19c in the front-rear direction to project outward in the vehicle width direction and to support the upper end of the rear damper 18. The rear wheel house 17 connected to the inner side of the damper base 19 in the vehicle width direction has the second bead 17c extending in the up-down direction and overlapping with the inner surface of the upper part of the first bead 19c of the damper base 19 in the vehicle width direction. The gusset 20 for reinforcing the connecting portion between the damper base 19 and the rear side frame 16 has the third bead 20a extending in the up-down direction and overlapping with the inner surface of the lower part of the first bead 19c of the damper base 19 in the vehicle width direction. Hence, the strength of the damper base 19 itself and the connection strength between the damper base 19 and the rear side frame 16 can be increased and the load input from the rear damper 18 to the damper base 19 can be reliably transmitted and absorbed to the rear side frame 16 while minimizing the increase in number of components and the increase in weight by overlapping the first bead 19c, the second bead 17c, and the third bead 20a.

The bulkhead 21 is provided inside the rear side frame 16, and the lower end of the gusset 20 is opposed to the bulkhead 21 with the upper wall 16a of the rear side frame 16 being disposed therebetween. Hence, the effect of the gusset 20 for reinforcing the connecting portion between the damper base 19 and the rear side frame 16 can be increased, and the load from the damper base 19 can be effectively distributed to the rear side frame 16.

Further, the damper-base stiffener 22 has the fourth bead 22d extending in the up-down direction and overlapping with the inner surface of the second bead 17c of the rear wheel house 17 in the vehicle width direction, and the damper-base stiffener 22 serves as a part of the rear wall of the upper cross member 15 that forms the upper side of the frame 12. Hence, the second bead 17c of the rear wheel house 17 and the fourth bead 22d of the damper-base stiffener 22 overlap with the first bead 19c of the damper base 19 in a three-layer form, and this increases the strength. In addition, rigidity of the rear part of the vehicle body can be increased by connecting the damper base 19 to the upper cross member 15 with the damper-base stiffener 22 being disposed therebetween.

The rear wheel house 17 has the opening 17d facing the lower end of the second bead 17c, and the opening 17d is closed by the damper base 19 from the outer side in the vehicle width direction. Hence, the weight of the rear wheel house 17 can be reduced by the opening 17d, and the strength of the rear wheel house 17 reduced by the opening 17d can be compensated for by the damper base 19 having high strength.

Since the upper end of the damper base 19 is connected to the rear end of the roof side rail 23, the load input from the rear damper 18 can be distributed to the roof side rail 23 via the damper base 19 having high strength.

While the embodiment of the present disclosure has been described above, it should be understood that various modifications in design can be made without departing from the spirit and scope of the disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle body structure for an automobile, comprising:
a damper base disposed at a rear of a cross member separating a cabin from a luggage compartment, the damper base including a lower end connected to an outer wall of a rear side frame in a vehicle width direction, and the damper base including a first bead projecting inward in the vehicle width direction and extending in an up-down direction, and a damper support portion projecting outward in the vehicle width direction to support an upper end of a damper, the damper support portion including a front damper support portion disposed on a front side of the first bead and a rear damper support portion disposed on a rear side of the first bead;
a rear wheel house including a second bead extending in the up-down direction to overlap with an inner surface of an upper part of the first bead of the damper base in the vehicle width direction; and
a gusset including a third bead extending in the up-down direction to overlap with an inner surface of a lower part of the first bead of the damper base in the vehicle width direction, the gusset including a lower end connected to an upper wall of the rear side frame.

2. The vehicle body structure for the automobile according to claim 1, wherein a reinforcing member is disposed inside the rear side frame, and the lower end of the gusset is opposed to the reinforcing member with the upper wall of the rear side frame being disposed therebetween.

3. The vehicle body structure for the automobile according to claim 1, wherein the cross member constitutes an upper side of a rectangular frame having a rectangular shape in rear view, and the vehicle body structure further includes a damper-base stiffener including a fourth bead extending in the up-down direction to overlap with an inner surface of the second bead of the rear wheel house in the vehicle width direction, and the damper-base stiffener constituting a part of a rear wall of the cross member.

4. The vehicle body structure for the automobile according to claim 1, wherein the rear wheel house has an opening disposed adjacent to a lower end of the second bead, and the opening is covered by the damper base disposed on an outer side in the vehicle width direction.

5. The vehicle body structure for the automobile according to claim 1, wherein an upper end of the damper base is connected to a rear end of a roof side rail.

6. The vehicle body structure for the automobile according to claim 1, wherein the damper base is disposed on an outer side of the rear wheel house in the vehicle width direction, the damper base includes (i) a vertical having the first bead and (ii) an inclined wall extending outward in the vehicle width direction from an upper end of the vertical wall, and the damper support portion projects outward in the vehicle width direction from the vertical wall and projects downward from the inclined wall.

7. The vehicle body structure for the automobile according to claim 6, wherein the upper end of the damper is connected to a bottom surface of the damper support portion.

8. The vehicle body structure for the automobile according to claim 6, wherein the damper base includes an outer bead continuously extends from an upper end of the first bead, the outer bead projects outward in the vehicle width direction from the vertical wall and projects downward from the inclined wall.

9. The vehicle body structure for the automobile according to claim 2, wherein the reinforcing member is a bulkhead.

10. The vehicle body structure for the automobile according to claim 4, wherein the lower part of the first bead of the damper base is exposed through the opening.

11. A vehicle comprising the vehicle body structure for the automobile according to claim 1.

* * * * *